United States Patent [19]

Gautchier et al.

[11] Patent Number: 5,626,903
[45] Date of Patent: May 6, 1997

[54] FAT SPARING SYSTEM, ESPECIALLY FOR COOKIE FILLER CREMES

[75] Inventors: Peter M. Gautchier, McHenry; William Dyer, St. Charles, both of Ill.

[73] Assignee: Van Den Bergh Foods Co., Division of Conopco, Inc., Lisle, Ill.

[21] Appl. No.: 475,147

[22] Filed: Jun. 7, 1995

[51] Int. Cl.$^6$ .................................................. A23D 9/007
[52] U.S. Cl. ...................... 426/611; 426/654; 426/659; 426/804; 426/572
[58] Field of Search .................. 426/572, 607, 426/654, 611, 659, 804

[56] References Cited

U.S. PATENT DOCUMENTS

| | | | |
|---|---|---|---|
| 2,177,983 | 10/1939 | Harris | 260/403 |
| 2,177,984 | 10/1939 | Harris | 260/403 |
| 3,199,988 | 8/1965 | Kozlik et al. | 426/570 |
| 3,248,229 | 4/1966 | Pader et al. | 426/654 |
| 3,671,459 | 6/1972 | Norris | 252/356 |
| 3,673,106 | 6/1972 | Jones | 252/356 |
| 4,310,556 | 1/1982 | Suggs et al. | 426/96 |
| 4,310,557 | 1/1982 | Suggs et al. | 426/96 |
| 4,524,086 | 6/1985 | Player et al. | 426/607 |
| 4,590,086 | 5/1986 | Takahashi et al. | 426/602 |
| 4,610,884 | 9/1986 | Lewis, III et al. | 426/103 |
| 4,670,272 | 6/1987 | Chen et al. | 426/94 |
| 4,707,374 | 11/1987 | King et al. | 426/572 |
| 4,711,788 | 12/1987 | Porcello et al. | 426/94 |
| 4,753,812 | 6/1988 | Wilson et al. | 426/250 |
| 4,826,696 | 5/1989 | Wilson et al. | 426/94 |
| 4,834,991 | 5/1989 | Porcello et al. | 426/94 |
| 4,865,859 | 9/1989 | Porcello et al. | 426/250 |
| 4,985,173 | 1/1991 | Takahashi et al. | 424/70 |
| 5,102,680 | 4/1992 | Glass et al. | 426/613 |
| 5,154,942 | 10/1992 | Hirschey et al. | 426/572 |
| 5,238,698 | 8/1993 | Zumbé et al. | 426/572 |
| 5,290,581 | 3/1994 | Campbell et al. | 426/570 |
| 5,306,516 | 4/1994 | Letton et al. | 426/531 |
| 5,436,021 | 7/1995 | Bodor et al. | 426/606 |
| 5,464,649 | 11/1995 | St. John et al. | 426/660 |
| 5,468,509 | 11/1995 | Schlup et al. | 426/548 |

FOREIGN PATENT DOCUMENTS

| | | |
|---|---|---|
| 1180250 | 1/1985 | Canada . |
| WO92/09209 | 6/1992 | WIPO . |

OTHER PUBLICATIONS

Weyland, "*Functional Effects of Emulsifiers in Chocolate*," The Manufacturing Confectioner, May 1994, pp. 2–8.

*Primary Examiner*—Jeanette Hunter
*Attorney, Agent, or Firm*—Gerard J. McGowan, Jr.

[57] ABSTRACT

A fat sparing composition, and cremes, particularly cookie filler cremes, utilizing the fat sparing composition. The composition includes a soft fat blend, and an emulsifier which is preferably a phosphated mono- or diglyceride or polyglycerol polyricinoleate. DATEM esters and lecithin may also advantageously be used. The fat sparer may be used to extend vegetable fat in cookie filler and other cremes.

2 Claims, No Drawings

FAT SPARING SYSTEM, ESPECIALLY FOR COOKIE FILLER CREMES

BACKGROUND OF THE INVENTION

The desire to reduce dietary fat has resulted in a demand for products having less fat but comparable texture, taste, etc. to their full fat counterparts. Replacing fat in sandwich cookie filler cremes has been particularly difficult. At least one sandwich cookie filling creme having reduced fat has been marketed, but it is desirable that the properties be improved to bring it closer to conventional full fat cremes.

King et al., U.S. Pat. No. 4,707,374 discloses an edible creme having low water activity comprising a cooked dispersion of modified starch and a hydrocolloid in a low moisture system which contains corn syrup. Preferably the thermostable creme also contains a fat and an emulsifier to improve texture. Comestible products are provided in the forms of creme puffs, layered pastries, fried pie cookie, extruded center filled collet or other forms. Proteins and gelling agents may also be used. Saturated or unsaturated fats may be employed. Suitable emulsifiers are said to include hydroxylated lecithin and mono, di or polyglycerides of fatty acids such as monostearin and monopalmatin. It is said that it may be desirable to add water. Preferably, the corn syrup is present in the creme in an amount from about 90% to about 95% based on the total weight of the creme.

Porcello et al., U.S. Pat. No. 4,865,859 discloses filler cremes for sandwich cookies which include an oleaginous composition having a specified solid fat index, and sugar. The oleaginous composition may contain an emulsifier such as polyglycerol esters in a minor amount. Also lecithin is said to be conventionally used as a processing aid to improve flow properties of a filler creme slurry, although it is said not to be needed in the filler cremes of the '859 invention.

Porcello et al., U.S. Pat. No. 4,834,991 discloses a filler creme which may be utilized as a filler for sandwich cookies or other baked goods. In alternative embodiments the invention can include an oleaginous composition in combination with an emulsifier. The emulsifiers are said to assist in the incorporation of sugar and other ingredients into the oleaginous composition. Lecithin can also be used as a processing aid to improve flow properties of a slurry.

Wilson et al., U.S. Pat. No. 4,826,696 is directed to sandwich creme filling compositions including a fat matrix and sugar. It is said that usually the composition contains lecithin as a processing aid, e.g. for viscosity control and/or an emulsifier, e.g. mono and diglyceride for aeration and mouthfeel. The composition is disclosed as being of the type positioned in sandwich fashion between baked cookies. A hydrogenated fat which is disclosed to be useful is Code 321 derived from soybean oil and normally plastic in consistency. A high stability oil that can be used in the '696 invention is Durkex 100. Emulsifiers which can be used in small amounts to aid in mixing include lecithin, e.g. 0.05 part per 1,000 parts of other ingredients. Monoglycerides and diglycerides are disclosed as being useful in small amounts for aeration and mouthfeel. Wilson et al. indicate that certain emulsifiers, for instance polyglycerol esters of fatty acids can be incorporated into the fat blend to increase fat plasticity and yield values. Triglycerol monostearate stabilizer can be added in an amount of up to 1%. In the composition of example 1, it is said that additional stabilization and firmness can be obtained by the addition to the composition of up to about 2% by weight of the lipid of the stabilizer, such as triglycerol monostearate. The compositions include about 40% fat.

Player et al. US Patent No. 4,524,086 discloses an emulsifier blend including polyglycerol esters useful in confectionery products.

Chen et al., U.S. Pat. No. 4,670,272 is directed to thermostable cremes produced by dispersing a hydrocolloid in corn syrup, dispersing a modified starch and albumin in the colloidal dispersion, aerating the dispersion and cooking the dispersion. An emulsifier may be included. Generally the corn syrup is from about 50 to about 90% by weight of unflavored creme.

Porcello et al., U.S. Pat. No. 4,711,788 concerns filler cremes which utilize fat or oleaginous compositions with specifically identified solid fat indexes. Alternative embodiments contain the oils in combination with an emulsifier such as polyglycerol esters. However the preferred embodiment does not contain emulsifiers.

Wilson et al., U.S. Pat. No. 4,753,812 discloses sandwich creme filling compositions which may include lecithin and/ or an emulsifier such as mono and diglycerides. Emulsifiers which are polyglycerol esters of fatty acids are also mentioned.

Norris, U.S. Pat. No. 3,671,459 disclosed emulsifiers which can be used in preparing bakery goods and confectioners products such as icings, frostings and creme fillings, or frozen desserts. From about 0.15–10% emulsifier basis weight of the edible comestible can be used in preparing the comestible, but typically from about 1 to 3% emulsifier basis weight of the composition is used. The edible hydrogenated emulsifier of the Norris invention includes lipoidal emulsifier, which is an edible alkoxylated partial fatty acid ester of glycerol.

Jones, U.S. Pat. No. 3,673,106 discloses emulsifier systems which may be used in, e.g., dairy whips.

Campbell et al., U.S. Pat. No. 5,290,581 discloses a whippable non-dairy creme based on high PUFA oil and which may include an emulsifier system such as one having DATA esters.

Kozlik et al., U.S. Pat. No. 3,199,988 discloses a process for preparing a whippable composition which may include emulsifier and shortening.

Pader et al., U.S. Pat. No. 3,248,229 discloses a dry emulsifier composition which can be used in combination with various fats for a multitude of purposes. Among the desiderata mentioned are providing a procedure for preparing a whipped topping by use of generally available fats. The Pader et al. emulsifiers contain phosphoric acid esters of partial glycerides, lactylated glycerol esters, partial glycol esters or mixtures thereof and partial glycerol esters. In Example IV, whipped toppings are prepared. In Example I, 28 grams emulsifier formulation, two (2) tablespoons of margarine, two tablespoons of sucrose and ½ cup of milk are used.

Suggs et al., U.S. Pat. No. 4,310,556 is directed to emulsifiers said to be useful in food products such as cakes, icings, creme fillings, whipped toppings, etc. The emulsifiers comprise a blend of succinylated monoglycerides, monoglycerides, propylene glycol monoesters and an alkali metal salt of a fatty acid. When the emulsifiers are added to creme fillings, rings and toppings the amounts will be 1–4% based on the weight of the shortening.

Suggs et al., U.S. Pat. No. 4,310,557 discloses emulsifiers used in food products such as cakes, icings, creme fillings, whipped toppings, etc. The emulsifiers comprise a blend of monoglycerides, propylene glycol monoesters and an alkali metal salt of a fatty acid. The emulsifier is said to be used in products such as icings, creme fillings and whipped toppings at a level of about 1–4% based on the weight of the shortening.

In Column 4 an example of a creme filling having shortening, powdered sugar, powdered milk, marshmallow creme, salt, water and emulsifier is included.

Lewis et al., U.S. Pat. No. 4,610,884 discloses a substantially water-free creme having from about 20 to about 50% of a rapidly melting confectionery fat and from about 50 to about 80% of a carbohydrate. Emulsifiers such as lecithin may be used.

Hirschey et al., U.S. Pat. No. 5,154,942 discloses a reduced fat creme said to be suitable for baked goods such as snack cakes. A vegetable shortening composition which includes a combination of polyglycerol ester such as triglycerol monostearate and an alkali stearoyl lactylate such as sodium stearoyl lactylte is used. Preferably the aqueous syrup contains a blend of a suitable syrup such as corn syrup in an amount of about 15 to 25% by weight on the creme and 0 to 5% water. Vegetable shortening is added in an amount of at least about 8% and typically about 8 to 13% by weight of the creme and preferably by about 12 to 13% by weight of the creme. It is said that the shortening must include a unique combination of emulsifiers. Additional emulsifiers such as mono and diglycerides and lecithin may be included. In Example 1, the aerated creme had a fat content of about 12.5%.

U.S. Pat. No. 5,306,516 mentions as partial fat replacements mono/diglycerides of fatty acids.

The confectionery industry uses emulsifiers to reduce viscosity in coating fats and chocolate coatings to enhance processing through equipment and to ensure complete coverage of the substance to be enrobed.

Weyland, "Functional Effects of Emulsifiers in Chocolate," The Manufacturing Confectioner, May 1994, pp. 2–8 describes the use of emulsifiers to achieve effects in chocolate.

SUMMARY OF THE INVENTION

The present invention is directed to cookie filler cremes having less fat and to compositions useful to spare or extend the fat in cookie filler cremes and other compositions, and to other products such as other types of cremes. It has been discovered that the fat in cookie filler cremes can be extended at least in part by an emulsifier or a plurality of emulsifiers. Advantageously, such cremes do not require high levels of corn syrup or glycerine. Particularly advantageous compositions according to the invention are cookie filler cremes or fat extenders or other products which include phosphated mono- and/or di-glyceride emulsifiers or polyglycerol polyricinoleate emulsifier.

In accordance with one aspect of the invention, the cookie filler creme includes an emulsifier, less than 40 weight % corn syrup, less than 15 weight % glycerine and less than 30 weight % fat. In accordance with preferred aspects of the invention, the cookie filler cremes include less than 10 weight % corn syrup, less than 5 weight % glycerine and less than 20 weight % fat. Particularly preferred are cookie filler cremes having less than 20 weight % fat and less than 0.5 weight % each of corn syrup and glycerine.

In a particularly preferred aspect of the invention, the invention is directed to a cookie filler creme including an emulsifier selected from a group including phosphated monoand/or di-glycerides and polyglycerol polyricinoleate. Indeed, in another aspect of the invention, a fat sparer is provided including an emulsifier selected from the group consisting of phosphated mono/diglycerides and polyglycerol polyricinoleate and a fat or fat blend. Preferably the overall fat or fat blend in the cookie filler or other creme, product (eg frosting or icing), or fat extender has a SFC at 20° C. of from 5–35, at 25° C. of from 1–25, at 30° C. of from 1–10 and at 35° C. a maximum of 4. More preferably the SFC for the fat blend or fat is as follows: at 20° C. from 5–20, at 25° C. from 1–12, at 30° C. from 3–10 and at 35° C. 4 maximum. A further preferred ingredient is lecithin, particularly in combination with phosphated mono- and/or diglycerides.

The cookie filler cremes, other cremes, fat extenders and other food products (such as frostings and icings) of the invention will generally include 50 wt. % or less moisture, especially 20 wt. % or less moisture and most preferably 10 wt. % or less moisture.

Cremes other than cookie filler cremes may, and other food products, may be prepared in accordance with the invention using the phosphated mon/diglyceride emulsifiers or polyglycerol polyricinoleate emulsifiers. Such cremes will preferably include 50 wt. % or less moisture, especially 20 wt. % or less moisture and most preferably 10 wt. % or less moisture. Also, toppings such as frostings may be formulated to include the fat sparer of the invention.

Diacetyl tartaric esters of monoglycerides (DATEM esters) may be advantageously used in the compositions of the invention, particularly in combination with phosphated mono/diglycerides.

Whereas full fat cookie fillings typically contain 30% or more triglyceride fat, with the present invention fat reduction down to as low as 16 weight % triglyceride fat based on the total composition on the cookie filler creme, or even lower, is possible, with minimal or no addition of glycerine, water or liquid corn syrups for enhanced flow properties. While applicants do not wish to be limited by theory, it is believed that the emulsifiers permit the triglycerides in the cookie filler creme and other products to be extended or "go further" in coating the solid particles such as sugars in the composition. Therefore, less triglyceride fat is required. It is believed that adjustments of the solid fat index contribute by permitting selection of a fat which soften readily and can therefore "liquify" to coat individual sugar/solid particles. The emulsifiers help to stretch and distribute the fat around the individual sugar/solid particles.

The cookie filler and other cremes of the invention preferably include less than 30 wt. % vegetable fat, especially less than 20 wt. % vegetable fat and particularly less than 18 wt. % vegetable fat.

The particle size of the sugar/solid matrix impacts the flow of the cookie filling in that larger particles are inherently easier to coat. Smaller particles have increased surface area and will require more fat. Average particle size can be expected to range from 1 to 100 microns, but preferred sizes range from 5 to 100 microns and most preferably the sugar and other Solid particles within the product range from 5 to 30 microns in diameter.

DETAILED DESCRIPTION OF THE INVENTION

The fat or fat blend used in the invention is preferably sufficiently soft to be able to enrobe the solid sugar and other particles within the cookie filler creme. The overall fat blend in the cookie filler or other creme should have an SFC at 20° C. of from 5–35, at 25° C. of from 1–25, at 30° C. of from 1–10 and at 35° C. a maximum of 4. More preferably the SFC for the fat blend or fat is as follows: at 20° C. from 5–20, at 25° C. from 1–12, at 30° C. from 3–10 and at 35° C. 4 maximum. Fat blends with similar SFCs may be used in the fat sparing compositions provided that any fat to be added thereto in the preparation of the end product does not appreciably change the SFC of the fat in the overall product.

A fat blend particularly useful as the soft fat of the invention comprises a blend of approximately 60% Durkex 100 brand fat and approximately 40% Code 321 brand fat, both products being available from Van den Bergh Foods of Lisle, Ill. Durkex 100 brand fat is a partially hydrogenated soybean oil and Code 321 is a normally plastic fat derived from soybean oil having a Wiley melting point of 95°–99° F., an and an SFI profile as follows: at 50° F., 34–43; at 70° F., 22–25; at 80° F., 16–19; 104° F., 2 maximum. The SFI for Durkex 100 fat is at 50° F., maximum 11. Durkex 100 fat has a Wiley melting point of about 67° F., and an IV of about 85–95.

The triglyceride fat may be derived from any suitable source. Typically the fat will be a partially hydrogenated vegetable oil such as partially hydrogenated soybean or cottonseed oils. Other possible fat sources include palm oil, palm kernel oil, coconut oil, sunflower oil, corn oil or canola oil. The triglyceride fat may be hydrogenated or partially hydrogenated.

Fat replacers and partial fat replacers such as medium chain triglycerides (MCTs), sugar polyesters, triglycerides including mixtures of long and short chain fatty acid moleties such as are found in the product Salad Trim sold by Pfizer, triglycerides made with medium and long fatty acid chains, highly esterified polyglycerol esters, acetin fats, plant sterol esters, polyoxyethylene esters, jojoba esters, mono/diglycerides of fatty acids, and mono/diglycerides of short-chain dibasic acids, branched chain fatty acid triglycerides, triglycerol ethers, polycarboxylic acid esters, sucrose polyethers, neopentyl alcohol esters, silcone oils and siloxanes, and dicarboxylic acid esters may be used.

The present invention permits a reduction in triglyceride fat content without requiring the high levels of glycerine (e.g., 14–18 wt. %) which are typical of prior reduced fat cookie creams. Reduction of glycerine is desirable in that it is a harsh tasting and costly ingredient. Levels of less than 13 wt. %, especially from 0 to 10%, are contemplated herein.

The present invention can be used with or in the absence of bulk phases of mesomorphic phases of emulsifier used to structure the food product. Such uses of mesomorphic phases are described in Heertje et al. WO 92/09209, published Jun. 11, 1992 and in Gautchier et al. US patent application Ser. No. 08/184,155 filed Jan. 21, 1994, the disclosures of which are both incorporated by reference herein.

The emulsifiers may be used at levels of up to about 4% based on the cookie filling creme, especially from 0.05 to 4%. Most preferred ranges for phosphated mono/diglycerides are from 1.5 to 2.5 wt. % and for lecithin is from 0.05–1.2 weight Preferably lecithin is used where phosphated mono/diglycerides are used. Phosphated mono/diglycerides are sold by Witco, eg under the name Emphos D70-30C. Polyglycerol polyricinoleate may be used, preferably at from 0.05–1 wt. % in the cookie filler cremes. A suitable polyglycerol polyricinoleate is Admul Wol 1412 available from Quest International of Itasca, Illinois. Similar levels of usage of the emulsifiers may be useful in other creme products.

In the fat sparing composition, the emulsifiers are used at preferably from 0.1 to 10 wt. %, especially from 0.5 to 3 wt. %.

Methods of preparation of phosphated mono and diglycerides are set forth in 21 C.F.R. Section 184.1521 and U.S. Pat. Nos. 2,177,984 and 2,177,983.

In addition to the emulsifiers mentioned above, in cases where aeration is desired, it may be useful to employ a polyglycerol ester emulsifier herein such as Santone 3-1-S XTR available from Van den Bergh Foods of Lisle, Ill.

The cookie filler or other creams may include a humectant such as polydextrose and optionally a preservative such as potassium sorbate. Other humectants might be employed, such as sorbitol, mannitol, xylitol, polyhydric alcohols (other than glycerine which is separately dealt with) and corn syrup solids. Generally a humectant which is not sucrose, dextrose, glucose, fructose or lactose is used. Humectants other than glycerine and sugars may be used at from 5–50 wt. % in the composition and from 1% and above in the cookie filling. Preferably, less than 0.5% humectant is employed.

Non-fat dry milk, buttermilk solids, whole milk solids or soy protein may be added in appropriate circumstances. Carbohydrates other than sugar solids can be used but are generally not prefered because their use may lead to problems due to moisture affinity. Starches such as corn syrup solids and low DE maltodextrins may be used bearing in mind that they will increase oil absorption. In preferred compositions, corn syrup solids are omitted.

The cremes of the invention can be prepared using conventional equipment such as a Hobart Mixer. One preferred order for ingredient addition is first uniformly distributing any formula glycerine through the dry ingredients, then mixing the fat blend in thoroughly. The filling can be warmed directly or by frictional heat to 95°–105° F. Any desired aeration can be accomplished by simultaneous high speed mixing and cooling to approximately 70° F. Depositing of the filling onto base cookies can be accomplished with typical depositor equipment.

Biopolymers (other than those elsewhere mentioned herein) may advantageously be used in the present compositions to produce products which are less grainy and/or have a reduced tendency to lose moisture. The biopolymer (s) may be present at a level of from, say, 0.05 to 30 wt. %, preferably between 0.1 and 25 wt. % Suitable biopolymer materials are for example carbohydrates (for example modified starches or gums) and certain proteins. Examples of very suitable biopolymer materials are milk protein, gelatin, soy protein, xanthan gum, carrageen, agar, pectins, rice starch, other starches, locust bean gum, modified and/or hydrolyzed starches (for example Paselli SA2 and N-oil) and microcrystalline cellulose and/or mixtures thereof with milk protein. Modified starch is preferably used at from 5–20%, gums preferably at 0.05 to 5% and gelatin at from 0.5 to 10 wt. %. While biopolymers may be used in appropriate cases, their use is not preferred as their inclusion tends to result in addition of water to the product, which tends to make it harder.

If hydrolysed starches are present their level is preferably from 5–20%; other gelling agents are generally used at levels of up to 10%.

Also suitable may be the use of two or more different biopolymer materials. An example of a suitable mixture of biopolymer materials is a combination of xanthan gum and locust bean gum.

Electrolytes such as sodium chloride may be incorporated. The amount of electrolytes such as salt in foodstuffs according to the invention preferably ranges from about 0.01–5 wt. %, more preferred 0.1–3%, for example 0.2 to 2% based on the total weight of the finished food product.

It may be desirable for fat containing foodstuffs to comprise less than 10% saturated fat or equivalent thereof on product and/or less than 10% trans fat or equivalent thereof on product.

Sugars, such as sucrose, dextrose, fructose and lactose are preferably included at levels of from 0 to 90, especially from 30 to 90, particularly from 50 to 80 wt. % in the cookie filling cremes and other cremes of the invention.

It is believed that some or all of the sugar mentioned above could be replaced by artificial sweeteners such as aspartame, sucralose, sodium saccharin and acesulfame K. Total sweeteners including natural and artificial sweeteners range from 0 to 90 wt. %, especially from 30 to 90, particularly from 50 to 80 wt. %.

The filling cream can be flavored as desired, e.g., with chocolate, vanilla, cheese, fruit, or any other desirable flavor. Likewise, color can be added.

The invention is also directed to frostings or icings utilizing the emulsifiers of the invention and which may have the indicated moisture, sugar and fats and fat levels given for cookie filling cremes.

EXAMPLE I

Fat Sparer

The following fat sparing composition is prepared.

| | |
|---|---|
| Durkex 100 | 58% |
| Code 321 | 39% |
| Phosphated Mono/Diglycerides | 2% |
| Lecithin | 1% |

Gautchier et al.

The fat sparer is made by blending and votating the ingredients.

EXAMPLE II

A cookie filler creme is prepared by blending the following ingredients.

| Ingredient | Wt. % Formula |
|---|---|
| Fat sparer of Example 1 | 18 |
| Salt | 0.2 |
| Granulated sugar | balance |
| Flavor | 0.5 |
| Dextrose | 23.3 |

An acceptable cookie filler creme having acceptable texture, adhesion and eating quality is obtained. A slight spread over storage occurs as compared to control samples.

What is claimed is:

1. A fat sparer comprising from 0.1 to 10 wt. % of an emulsifier selected from the group consisting of phosphated monoglyceride, phosphated diglyceride and polyglycerol polyricinoleate, and a triglyceride fat or triglyceride fat blend having an SFC at 20° C. of from 5–15, at 25° C. of from 1–25, at 30° C. of from 1–10 and at 35° C. a maximum of 4.

2. A fat sparer comprising from 0.1 to 10 wt. % of an emulsifier selected from the group consisting of phosphated monoglyceride and phosphated diglyceride and a triglyceride fat or triglyceride fat blend having an SFC at 20° C. of from 5–35, at 25° C. of from 1–25, at 30° C. of from 1–10 and at 35° C. a maximum of 4.

* * * * *